(12) United States Patent
Hopkins

(10) Patent No.: US 7,059,517 B2
(45) Date of Patent: Jun. 13, 2006

(54) ON-LINE PIN VERIFICATION USING POLYNOMIALS

(75) Inventor: W. Dale Hopkins, Georgetown, KY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 218 days.

(21) Appl. No.: 10/750,119

(22) Filed: Dec. 31, 2003

(65) Prior Publication Data

US 2005/0139657 A1 Jun. 30, 2005

(51) Int. Cl.
*G06K 7/01* (2006.01)
(52) U.S. Cl. ............... 235/382.5; 235/382; 380/44
(58) Field of Classification Search ........... 235/382.5; 380/44
See application file for complete search history.

(56) References Cited

U.S. PATENT DOCUMENTS

| 4,193,131 | A | | 3/1980 | Lennon et al. |
|---|---|---|---|---|
| 4,223,403 | A | | 9/1980 | Konheim et al. |
| 4,405,829 | A | * | 9/1983 | Rivest et al. ............... 380/30 |
| 4,500,750 | A | | 2/1985 | Elander et al. |
| 5,214,698 | A | | 5/1993 | Smith, Sr. et al. |
| 5,513,263 | A | * | 4/1996 | White et al. ............... 380/44 |
| 5,631,962 | A | * | 5/1997 | Balph et al. ............... 713/170 |
| 6,377,689 | B1 | * | 4/2002 | Vanstone et al. ........... 380/259 |
| 6,708,893 | B1 | * | 3/2004 | Erfani et al. ............... 235/492 |
| 2001/0001155 | A1 | | 5/2001 | Smith, Sr. et al. |
| 2003/0076960 | A1 | | 4/2003 | Chandersekaran et al. |
| 2003/0196106 | A1 | * | 10/2003 | Efrani et al. ............... 713/200 |
| 2004/0048897 | A1 | * | 3/2004 | Lim ............... 713/186 |
| 2004/0086117 | A1 | * | 5/2004 | Petersen et al. ............... 380/44 |
| 2005/0058288 | A1 | * | 3/2005 | Sundaram et al. ........... 380/258 |

\* cited by examiner

*Primary Examiner*—Steven S. Paik

(57) ABSTRACT

A technique for on-line Personal Identification Number (PIN) verification uses polynomial hiding. The technique comprises enrolling a smart card, including initializing a smart card with an entity-selected PIN hidden in a polynomial over a finite field. The initialization polynomial is a function of the PIN, an entity-identifier, and a random number. The random number and the PIN are discarded after smart card initialization.

41 Claims, 5 Drawing Sheets

ON-LINE PIN VERIFICATION USING POLYNOMIALS

BACKGROUND OF THE INVENTION

Each day in the United States alone over 100 million transactions aggregating $5 Billion are authorized and initiated by cardholders at over 400,000 Automated Teller Machines (ATMs) and seven million Point-of-Sale (POS) terminals. Securing the massive daily financial flow against fraud and loss relies upon protecting and verifying cardholder Personal Identification Numbers (PINs) using methods, structures, and cryptographic algorithms originating over twenty-five years ago.

Data security systems, such as financial systems, use security techniques and systems originating in the early 1980s that were based on technologies created in the late 1970s. Computational power, cryptanalytic knowledge, breadth of targets, and creative ingenuity accessible to potential attackers have grown dramatically since origination of the systems, while defensive technologies have scarcely evolved.

The Personal Identification Number (PIN) is a basic construct for establishing identity and authorization for consumer financial transactions.

Current PIN verification techniques are cryptographically weak, resulting in a data security vulnerability that even exceeds weaknesses in underlying keys and algorithms. These weaknesses can be attacked by an adversary, potentially resulting in a loss of data security.

Present-day financial and commercial transaction systems predominantly use cryptographic algorithms with known weaknesses. One difficulty is that conventional techniques involve sending the PIN through the network, enabling an adversary to access the PIN and potentially compromise or breach security offered by using the PIN. Because the PIN is communicated on the network, security is attempted in conventional systems by encrypting the PIN. However, advances in technology have substantially rendered common encryption methods, such as Data Encryption Standard (DES), vulnerable to attack.

SUMMARY

What is desired is a PIN verification technique that enables verification without sending the PIN over a network and exposing the PIN to compromise.

In accordance with an embodiment of a data security system, a technique for on-line Personal Identification Number (PIN) verification uses polynomial hiding. The technique comprises enrolling a smart card, including initializing a smart card with an entity-selected PIN hidden in a polynomial over a finite field. The initialization polynomial is a function of the PIN, an entity-identifier, and a random number. The random number and the PIN are discarded after smart card initialization.

BRIEF DESCRIPTION OF THE DRAWINGS

Embodiments of the invention relating to both structure and method of operation may best be understood by referring to the following description and accompanying drawings.

DETAILED DESCRIPTION

A transaction system has a capability to verify passwords such as Personal Identification Numbers (PINs) entered into a transaction terminal processed by a smart card and then transported through a potentially hostile network to be verified at an authorization server. The password is hidden in a reference polynomial and a single point on a curve defined by the polynomial is stored on the authorization server. At the smart card, an entered password is hidden in a randomly generated polynomial and a single point from a curve defined by the polynomial is transmitted through a network to a host capable of authorizing the password. Neither the host nor the smart card have sufficient information to reconstruct the actual password but do have sufficient information to verify that the correct password is entered at a remote terminal.

A technique for on-line Personal Identification Number (PIN) verification using smart cards is based on hiding a secret value in an ephemeral polynomial. The approach involves hiding an entity PIN, such as a customer PIN, in polynomials of the form $$y = a_0 + \sum_{i=1}^{N} a_i x^i \pmod{P}.$$

A simple example of a polynomial is a first-order polynomial of the form $y = a_0 + a_1 x \pmod{P}$. Using the technique, the PIN is never transmitted to a host, nor reconstructed as part of the verification process. In a typical embodiment, at no time does either the host or the smart card have sufficient information to reconstruct the customer PIN.

The PIN verification technique using an ephemeral polynomial is useful in financial transaction security as is shown in the illustrative embodiment. The technique can similarly be used in other information security fields for application generally to passwords. For example, the technique can be application to Personal Identification Numbers (PINs) selected from among one or more of identification numbers, passwords, some pictorial images, and the like.

Figure 1:
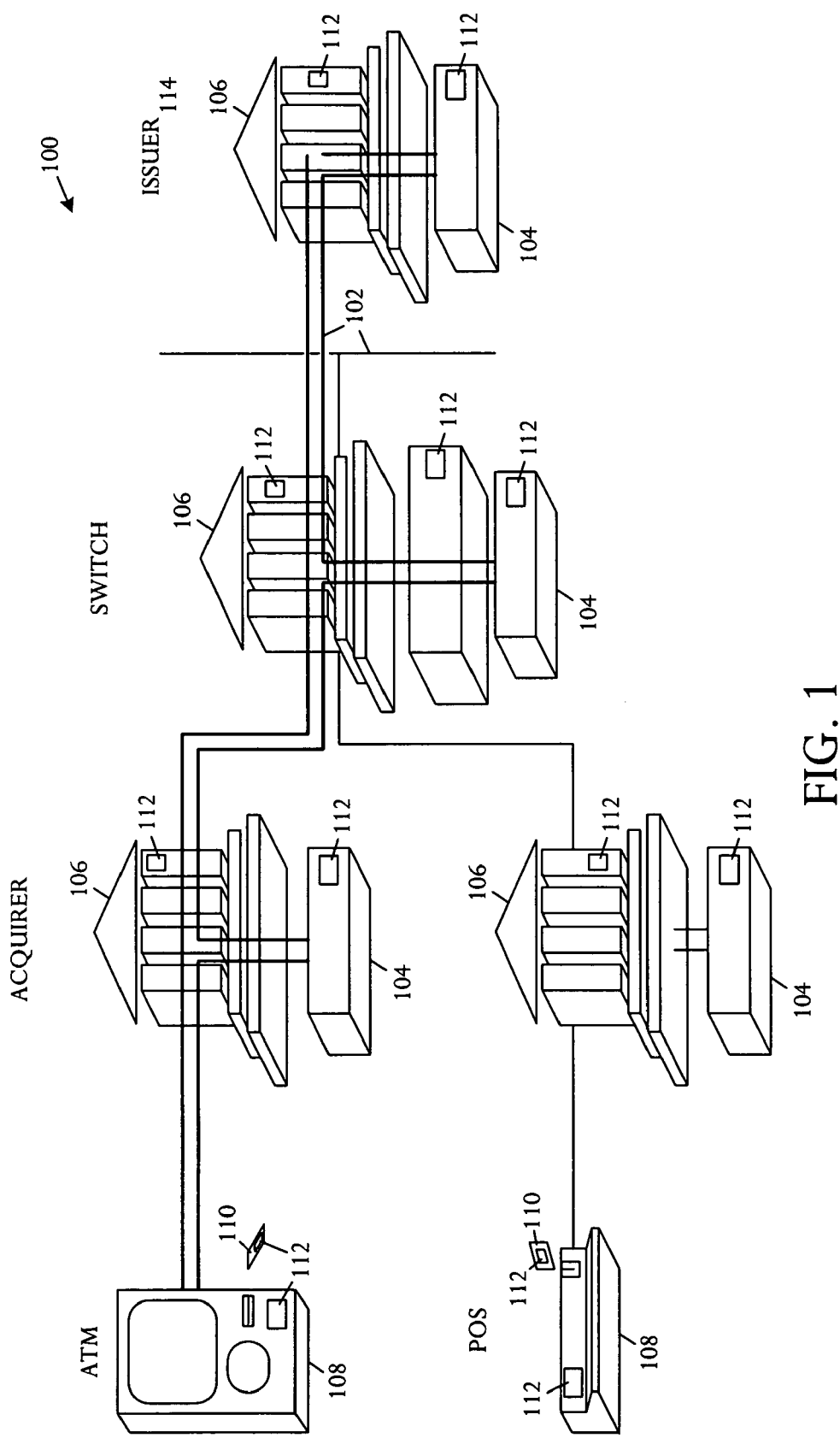
FIG. 1 is a schematic block diagram that depicts an embodiment of a transaction system capable of using an ephemeral polynomial for on-line Personal Identification Number (PIN) verification.

Referring to FIG. 1, a schematic block diagram depicts an embodiment of a transaction system 100 capable of using an ephemeral polynomial for on-line Personal Identification Number (PIN) verification. The transaction system 100 comprises a network 102, a plurality of servers 104 and/or hosts 106 coupled to the network 102, and a plurality of on-line terminals 108 coupled to network. The transaction system 100 further comprises a plurality of smart cards 110 that are enrolled in the transaction system 100 and capable of insertion into the on-line terminals 108 and performing transactions via the servers 104. A plurality of processors 112 are distributed among the smart cards 110, the servers 104, and/or the on-line terminals 108. At least one of the processors 112 can execute on-line PIN verification based on hiding an entity-selected Personal Identification Number (PIN) in an ephemeral polynomial over a finite field. The servers 104, hosts 106, terminals 108, smart cards 110, and processors 112 are numbered generically for simplicity of illustration and to avoid unwieldy numeration in the text, although various different types of devices and components may be and typically are implemented in a particular transaction system 100. For example, a processor 112 within a smart card 100 is typically very different from a processor 112 in a terminal 108, server 104, or host 106.

Figure 2:
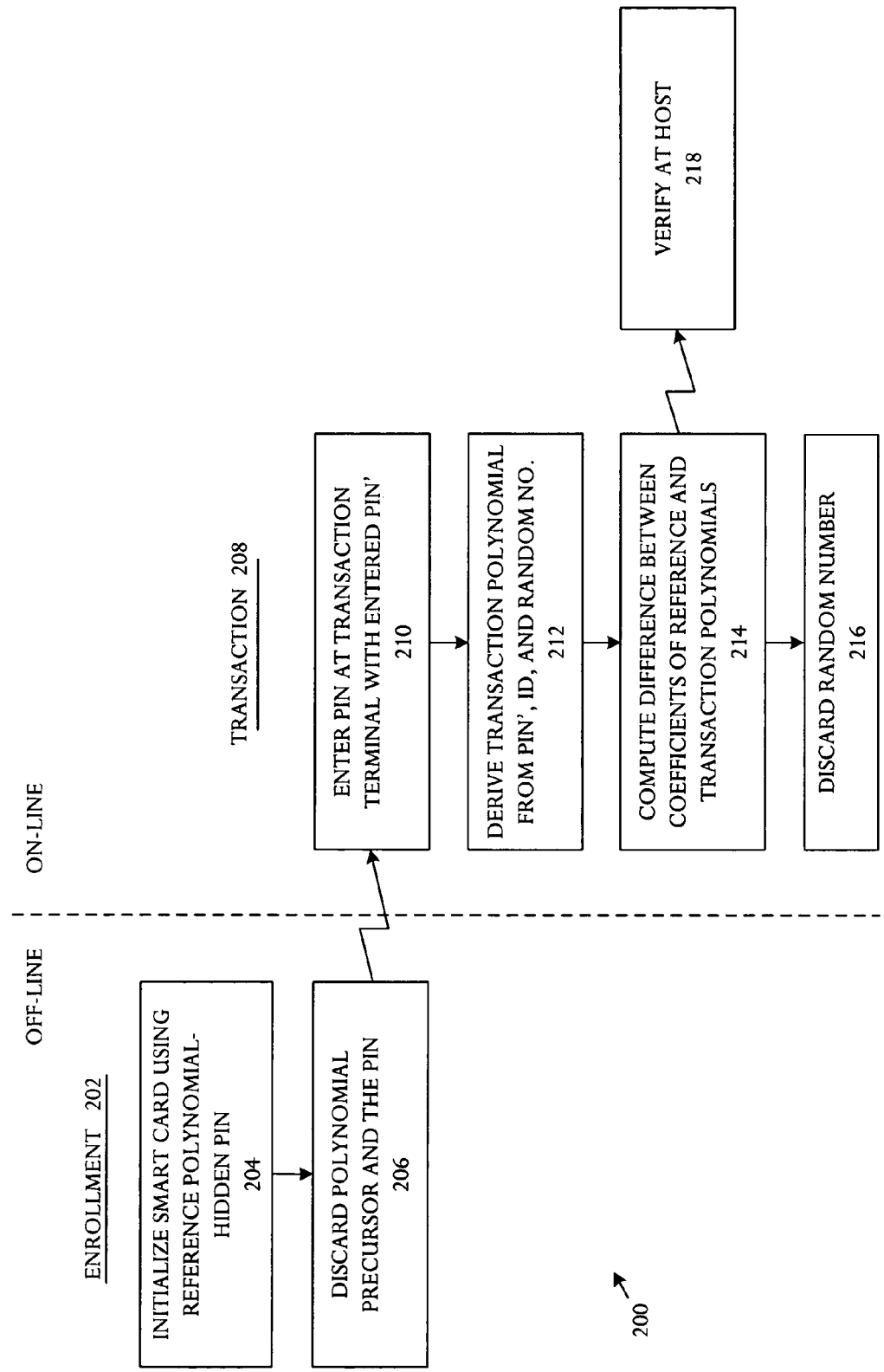
FIG. 2 is a flow chart that illustrates an embodiment of a technique for on-line Personal Identification Number (PIN) verification using ephemeral polynomial hiding.

Referring to FIG. 2, a flow chart illustrates an embodiment of a technique for on-line Personal Identification Number (PIN) verification using ephemeral polynomial hiding 200. The method comprises enrolling a smart card 202, for example in a process that takes place off-line. Enrollment 202 includes initializing a smart card 204 with an entity-selected PIN hidden in a reference polynomial over a finite field. The initialization polynomial is a function of the PIN, an entity-identifier, and a random number.

The reference polynomial generated during the initialization phase has the form:

$$y_r = a_{r0} + \sum_{i=1}^{N} a_{ri} x^i \pmod{P},$$

where $a_{ri}$ represent random numbers and N designates the order of the polynomial. In the illustrative example, x can be used to designate an entity-identifier, such as a Primary Account Number (PAN), account number, or the like. The entity or customer Personal Identification Number (PIN) is set equal to $a_{r0}$. In various applications, $a_{r0}$ can be any appropriate secret code or number, such as a PIN, a password, or the like, for usage in transaction verification. P is the modulus of the polynomial and can be a large number, for example a prime number.

If the polynomial is first order, then the polynomial equation is:

$y_r = \text{PIN} + a_{r1} x \pmod{P}.$

For an Nth order polynomial, the polynomial equation can be:

$y_r = \text{PIN} + a_{r1} x + a_{r2} x^2 + \ldots + a_{rN} x^N \pmod{P},$ $$y_r = \text{PIN} + \sum_{i=1}^{N} a_{ri} x^i \pmod{P}.$$

A single point on a curve represented by the polynomial is given by x-y coordinates $(x, y_r)$. The value x can be a unique identifier such as an account number, PAN, or the like.

Also during the initialization phase 202, at least one reference value is computed and stored on the smart card. For an Nth order polynomial, the reference values can be described using equations of the form:

$z_1 = \text{PIN}^{-1} a_{r1} \pmod{P},$ $z_2 = \text{PIN}^{-1} a_{r2} \pmod{P},$ $z_N = \text{PIN}^{-1} a_{rN} \pmod{P}.$ The values $z_1, z_2, \ldots, z_N$ are stored in the smart card for subsequent transactions. For a first order polynomial, the reference value is described by an equation of the form:

$z_1 = \text{PIN}^{-1} a_{r1} \pmod{P}.$

Also during initialization, encryption values are placed on the host database including the entity-identifier x such as account number, PAN, or the like, and a value $E_{KDB}[y_r]$ that represents an encryption of the value $y_r$ using a database key $K_{DB}$. The encryption can be any suitable type of encryption such as Data Encryption Standard (DES), triple-DES, Advanced Encryption Standard (AES), and the like. Information groups including x, $E_{KDB}[y_r]$ are stored in the host database. The value $E_{KDB}[y_r]$ can be decrypted subsequently for PIN verification during a transaction. Also, the value $E_{KDB}[y_r]$ is reversible in the sense that the value can be decrypted to recover the value $y_r$.

The random number and the PIN are discarded after smart card initialization 206.

During a transaction 208, that typically takes place on-line, a smart card is inserted at a transaction terminal and an entity, such as a customer, enters a PIN' that is used to create a transaction polynomial to verify the transaction. The transaction polynomial may be termed an "ephemeral" polynomial since a new polynomial is generated for individual transactions. At the transaction terminal, the entity or customer inserts the smart card into a card reader and enters the PIN', for example using a keyboard. The ephemeral transaction polynomial is derived 212 as a function of the entity-entered PIN', the entity-identifier, and a second random number. The PIN' is entered at the transaction terminal and is verified at a host.

The ephemeral transaction polynomial can be of the form:

$$y_t = \text{PIN}' + \sum_{i=1}^{N} a_{ti} x^i \pmod{P},$$

where PIN' is the Personal Identification Number entered by the customer in the on-line transaction. The host verifies that the reference PIN is equal to the entered PIN' without having access to the customer's actual reference PIN. In the example of a first degree polynomial, the transaction polynomial equation has the form:

$y_t = \text{PIN}' + a_{t1} x \pmod{P}.$

The smart card generates a random number $a_{t1}$ in a range from L to P and computes, using $a_{t1}$ and secret values $z_1$, N coefficients $a'_{ri}$, for i from 1 to N according to an equation of the form:

$a'_{ri} = \text{PIN}' \cdot z_i \pmod{P},$ with a value $a'_{r1}$ computed for each degree of the polynomial. The secret value $z_1$ is computed during a previous enrollment action in a manner discussed hereinafter. If the entered PIN' is not correct, the value $a'_{r1}$ is incorrect and subsequently fails verification at the host. The smart card then computes at least one difference value $d1 = a'_{r1} - a_{t1}$ and immediately erases $a_{t1}$. The smart card encrypts value $y_t$ under a transmission key KC that is shared between the host and transaction terminal to form a value $E_{KC}[y_t]$. Key KC is not related to a database key KDB that is predefined for the particular database. Accordingly, quantities x, d, and $y_t$ are sent from the transaction terminal to the host system with values d and $y_t$ encrypted in the key KC. Accordingly, a function of the verification polynomial and the difference between the second random number and a function of the PIN' and the secret function are sent to a host 214, and the second random number is discarded 216.

The host receives the quantities x and $E_{KC}[d, y_t]$ and performs a verification action 218. The host has a security module that decrypts the value $E_{KC}[d, y_t]$ and restores the values d and $y_t$ for usage with x and $y_r$ to verify the PIN by determining whether the original reference PIN is equivalent to the entered PIN' based on a relationship among the entity-identifier and a function of the initialization polynomial received from the on-line authorization system and the difference and function of the verification polynomial. The host decrypts the value $E_{KDB}[y_r]$ determined at enrollment to recover value $y_r$. The host thus has access to the entity-identifier x and the polynomial $y_r$ and quantities x, d, and $y_t$ received from the transaction terminal. The host verifies the PIN by determining equality or inequality of the relationship, for an Nth degree polynomial:

$$y_r - y_t = \sum_{i=1}^{N} d_i x^i (\text{mod } P),$$

where $d_i = a_{ri} - a_{ti} (\text{mod } P)$. If the values are equal, then the PIN is verified. Similarly, for a first order polynomial, equality of the relationship:

$$y_r - y_t = d_1 x (\text{mod } P)$$

is determined, where $d_1 = a_{r1} - a_{t1}$.

In an alternative embodiment, in the enrollment action 202 the value $y_r$ can be stored in an irreversible form using a cryptographic hash function. Rather than storing the values x, $E_{KDB}[y_r]$, the values can be stored in a form created using a keyed hash function called a Hash Message Authentication Code (HMAC). Using HMAC storage, the value $y_r$ cannot be recovered, increasing system security. In one example, the values stored can include x, h(KDB, x, $y_r$) and the verification equations become:

$$h(KDB, X, y_r) = h(KDB, x, y_t + d_1 x)$$

for a first degree polynomial, or:

$$h(KDB, X, y_r) = h\left(KDB, x, y_t + \sum_{i=1}^{N} d_i x^i\right)$$

for an Nth degree polynomial.

Figure 3:
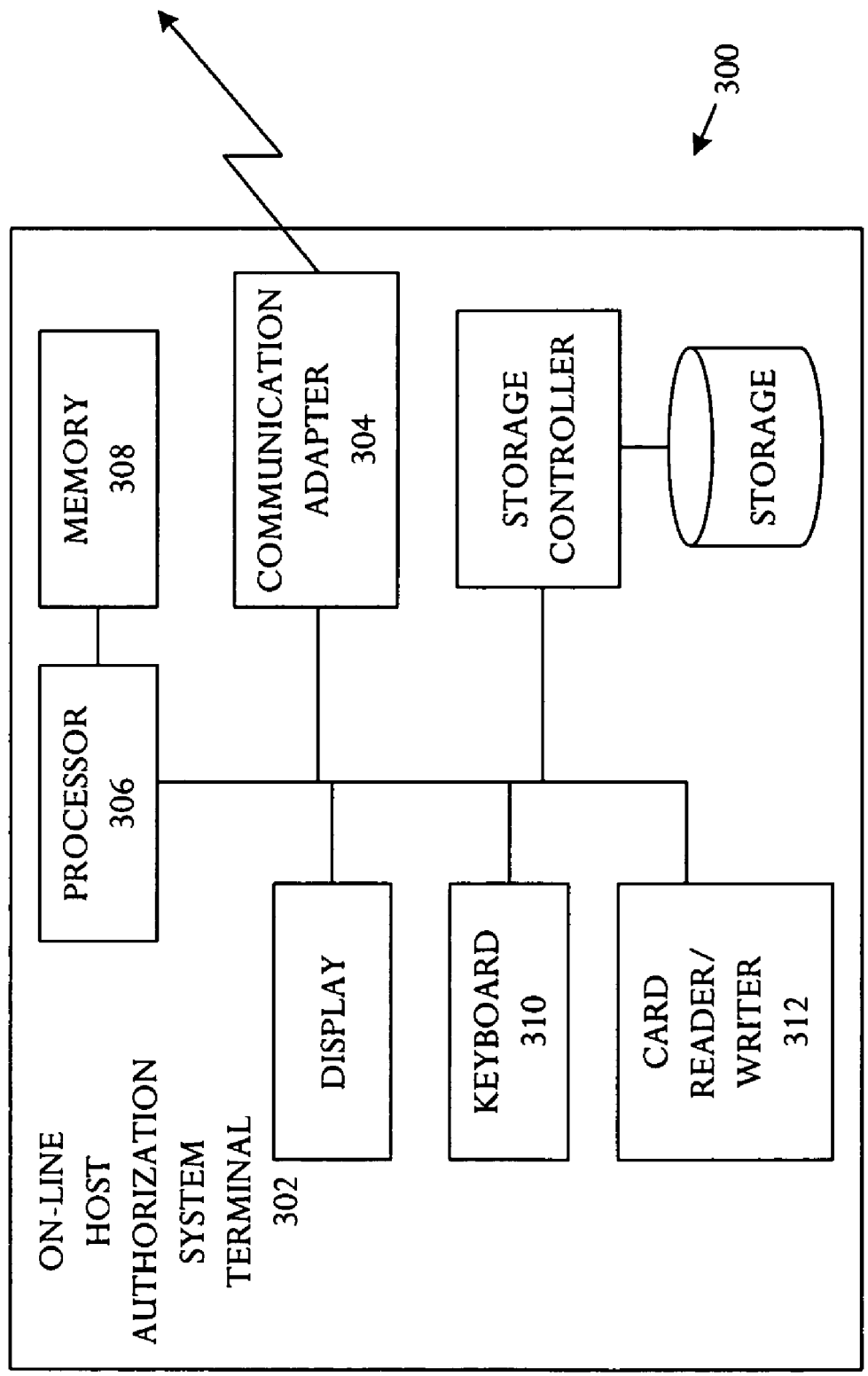
FIG. 3 is a schematic block diagram illustrating an embodiment of a data security system that includes a terminal used to capture a Personal Identification Number (PIN) for usage in an on-line host authorization system.

Referring to FIG. 3, a schematic block diagram illustrates an embodiment of a data security system 300 that includes a terminal 302 for capturing a Personal Identification Number (PIN) for usage in an on-line host authorization system. The terminal 302 can be used to enroll a smart card for usage in on-line Personal Identification Number (PIN) verification. The on-line host authorization system terminal 302 comprises a communication interface 304 capable of communicating with a network 102, a user interface 310 such as a keyboard for receiving information from an entity such as a customer, and a card reader and/or writer 312 configured to accept a smart card 110. The on-line host authorization system terminal 302, in combination with the smart card 110, executes on-line Personal Identification Number (PIN) enrollment for subsequent transaction verification based on hiding an entity-selected PIN in an ephemeral polynomial over a finite field.

The on-line host authorization system terminal 302 further comprises a processor 306 coupled to the communication interface 304 and a memory 308 coupled to the processor 306. The memory 308 contains a computable readable program code capable of causing the processor 306 to interact with an entity via the user interface 310 and the smart card via the card reader/writer 312 to perform initialization and enrollment actions. The memory further contains a computable readable program code that receives a reference Personal Identification Number (PIN) via the user interface 310 and sends the PIN to the smart card. The smart card stores an entity-identifier x, for example an account number, Primary Account Number (PAN), or the like, which is either previously written to the smart card, received via the communication interface 304 from a host, or supplied by the entity or customer at the terminal 302. The smart card generates a reference or initialization polynomial of the form:

$$y = a_0 + \sum_{i=1}^{n} a_i x^i (\text{mod } P),$$

where P is a large prime number. A secret value, the PIN, is hidden in the degree-n polynomial, in a particular embodiment hidden in the coefficient $a_0$. The method is valid for hiding the secret value in the coefficients for any degree polynomial, and works well for a first degree polynomial. As a byproduct, the illustrative technique defines a new PIN block for transmission of PIN-related data through a network.

The illustrative system is described in the context of a smart card application, in contrast to a system that uses a magnetic stripe card for holding transaction data, in light of the powerful attributes of the technique that can be implemented in a smart card. The technique can also be implemented with magnetic stripe cards, although some of the security capabilities are unavailable or diluted in a magnetic stripe card system. However, even in magnetic stripe card application of the illustrative techniques improve over traditional PIN verification algorithms. The ephemeral polynomial approach significantly improves PIN verification security, particularly when implemented with smart cards.

The on-line PIN verification technique has two parts, first the actions performed in an enrollment process, often performed off-line, to initialize and personalize a smart card, and second the operations that occur each time a PIN is entered to authorize a financial transaction on an entity account, for example a customer's account. The authorization processing includes operations executed on the smart card, information transferred from the smart card to a host system, and operations executed on the host system verify that a correct PIN is entered.

Figure 4:
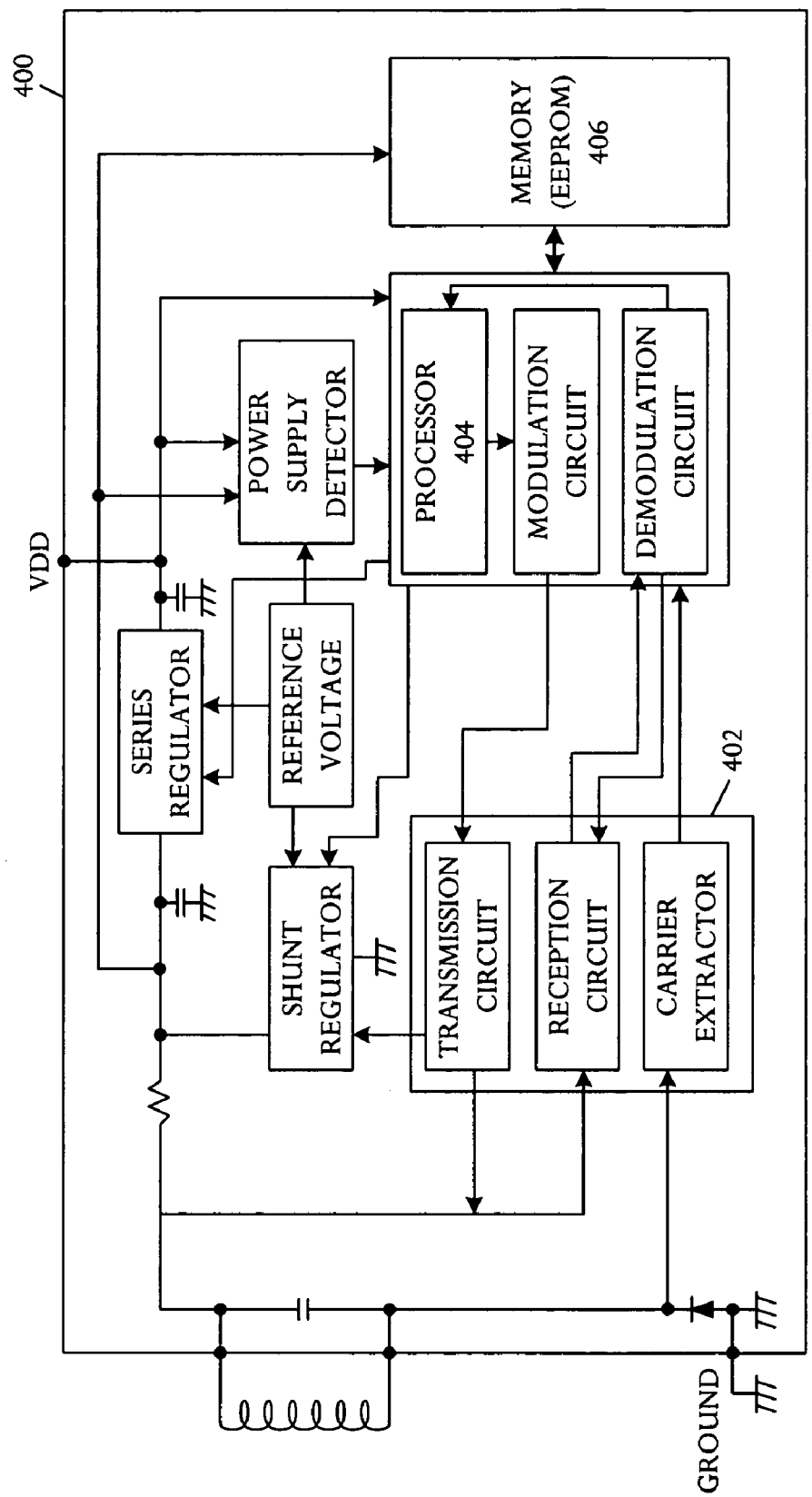
FIG. 4 is a schematic block diagram depicting an embodiment of a smart card that can be used for on-line Personal Identification Number (PIN) verification.

Referring to FIG. 4, a schematic block diagram depicts an embodiment of a smart card 400 that can be used for on-line Personal Identification Number (PIN) verification using a first-degree polynomial. The techniques can easily be extended to higher degree polynomials in the manner depicted in the discussion of FIG. 2. The smart card 400 comprises an interface 402 capable of communicating with an on-line authorization system and/or a host, a processor 404 coupled to the interface 402, and a memory 406 coupled to the processor 404. The memory 406 contains a computable readable program code that executes on-line PIN verification based on hiding an entity-selected PIN in an ephemeral polynomial over a finite field.

FIG. 3 and FIG. 4 depict components of a transaction system that execute an enrollment process that includes initialization and personalization of a smart card 400. In the illustrative description a smart card 400 is initialized to contain a secret value derived from an entity-identifier x and a Personal Identification Number (PIN). In many applications the card owner is a customer of a commercial transaction so that the entity-identifier is a customer identifier. Accordingly, the number x can be a customer account number such as a Universal Unique IDentifier (UUID) or a Primary Account Number (PAN). The PIN is typically selected by the entity or customer. In some embodiments, the PIN can be a password or other transaction activation signal.

In various transaction systems and protocols, the account number x may be represented or padded in multiple different known methods. The illustrative technique is applicable for any representation. The representation of the Personal Identification Number (PIN) may be constructed as a block with a control character, followed by the length of the PIN and then the PIN digits. In some representations, the PIN can be represented as a data block in which the PIN is concatenated or padded with all zeros or with certain digits of the account number or entity-identifier x. Particular details of representation or padding are common to essentially all PIN verification techniques and are readily accommodated within the illustrative structure and utilized according to the disclosed techniques or methods.

Modulus P is selected as a large prime integer, chosen to be greater than the largest entity account number or identifier to be used in a transaction system. Modulus P is a public, system-wide parameter and is therefore common to all cards enrolled in the system and a known, non-secret value.

The enrollment process takes place in an interaction between the on-line host authorization system terminal 302, commonly through operations of an enrollment system, and a smart card 400 to be enrolled. Some of the actions are executed in a processor 306 within the on-line host authorization system 302 and some in the processor 404 inside the smart card 400. The modulus P can be specified throughout the on-line host authorization system. To begin the enrollment process, the smart card 400 receives the modulus P, the unique entity-identifier x, and the customer-selected PIN at least in part from the on-line host authorization system terminal 302.

The processor 404 in the smart card 400 receives the modulus P, entity-identifier x, and PIN. The processor 404 generates a random number $a_{ri}$ in a range between a lower limit L and the modulus P as an upper limit, according to the relationship:

$$L \leq a_{ri} \leq P, \text{ for } 1 \leq i \leq N$$

where the lower limit L has a value in s range, for example, of 5000 or 10000, and N is the polynomial order. The processor 404 temporarily stores the random number $a_h$ in the smart card 400.

The processor 404 computes a polynomial value $y_r$ according to an equation of the form:

$$y_r = \text{PIN} + a_{r1} \cdot x \pmod{P}.$$

The processor 404 sends encrypts the polynomial value and sends the encryption $E_k[y_r]$ of the polynomial value $y_1$ back to the enrollment system, which in turn supplies the encryption $E_k[y_r]$ to the on-line host authorization system 302. Upon receiving the encryption $E_k[y_r]$, the on-line host authorization system 302 possesses two items of data including the account number x and a reference cryptogram $E_{KBD}[y_r]$, where KDB is a database key. The randomly-generated coefficient $a_{r1}$ is not known to the on-line host authorization system 302. Furthermore, the coefficient $a_r$ is not kept on the smart card.

Continuing in the enrollment process, the processor 404 on the smart card 400 computes a secret key $z_1$ according to an equation of the form:

$$z_1 = \text{PIN}^{-1} \cdot a_{r1} \pmod{P}.$$

The processor 404 erases the coefficient $a_{r1}$ and PIN. The processor 404 permanently retains the secret key $z_1$, for example in the memory 406. Therefore, even if the key value $y_r$ at the on-line host authorization system 302 becomes compromised or known, for example by an adversary, the PIN cannot be computed.

The two items of information stored on the on-line host authorization system 302, including the key $y_r$ and the entity-identifier x, represent one point $(x, y_r)$ on the polynomial created in the smart card. The on-line host authorization system 302 possesses no other information and therefore cannot regenerate the original polynomial. At the end of the enrollment process, the on-line host authorization system 302 and the smart card 400 are prepared to authorize transactions.

Although the illustrative example depicts enrollment using a first degree polynomial, any suitable polynomial of equal or higher degree may be used.

Figure 5:
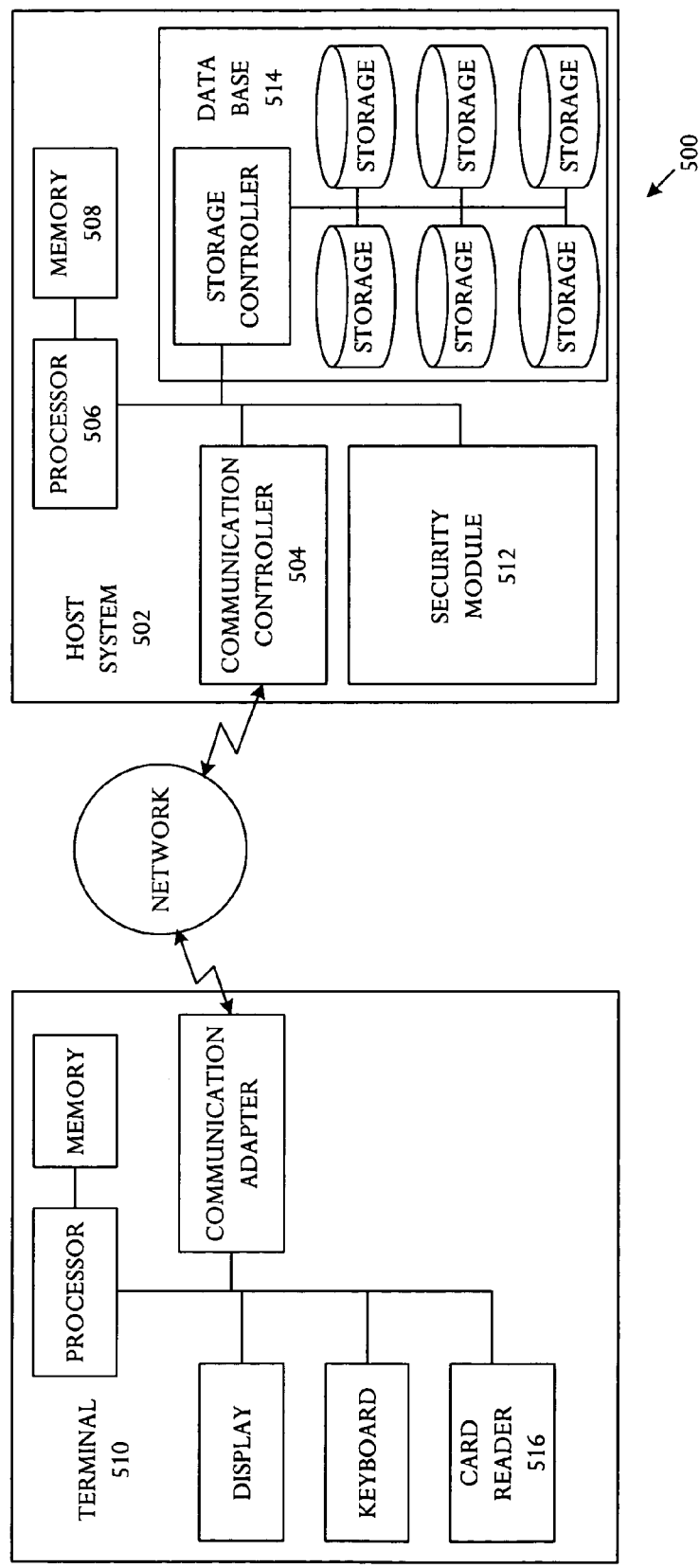
FIG. 5 is a schematic block diagram that illustrates an embodiment of a data security system comprising a remote terminal and a host system capable of on-line Personal Identification Number (PIN) verification.

Referring to FIG. 5, a schematic block diagram illustrates an embodiment of a data security system 500 comprising a host system 502 capable of on-line Personal Identification Number (PIN) verification. The host system 502 comprises a communication interface 504 that can communicate with a terminal 510 configured to accept a smart card. The smart card is entered into a card reader 516 in the terminal 510 and operates in combination with the host system 502 and terminal 510 to execute on-line PIN verification based on hiding an entity-selected PIN in an ephemeral polynomial over a finite field. The host system 502 further comprises a host database 514 capable of storing enrollment information for a plurality of enrolled smart cards. A processor 506 is coupled to the communication interface 504 and the database 514. The host system 502 further comprises a memory 508 coupled to the processor 506. The memory 508 contains a computable readable program code capable of causing the processor 506, typically as part of or in conjunction with a security module 512, to perform PIN verification from information received from the smart card. The host system 502 receives information from a transacting smart card that relates to a point on a curve generated from a polynomial hiding an entered PIN' and compares the smart card information to database information relating to a point on a curve generated from a reference polynomial hiding an enrollment PIN.

In a particular example, the host system 502 receives a difference function and a verification polynomial function from the smart card, and receives an entity-identifier and initialization polynomial function from the host database 514. The processor 506 can perform a comparison operation on the difference function, the entity-identifier, the verification polynomial function, and the initialization polynomial function to determine PIN verification.

FIG. 4 and FIG. 5 depict components of a transaction system that execute a Personal Identification Number (PIN) verification process based on a first degree polynomial. The technique is simply extended to higher degree polynomials as described with respect to FIG. 2. A transaction begins in the smart card 400 at an entity-activated terminal 510, such as a customer-activated terminal. The smart card 400 receives a Personal Identification Number, designated herein as PIN', which is entered by an entity or customer at the terminal 510. The processor 404 in the smart card 400 generates a random number $a_t$ having a value in the range between the lower limit L and the upper limit imposed by the modulus P according to the relationship:

$$L \leq a_t \leq P.$$

The smart card processor 404 uses the random number $a_t$ and the secret key $z_1$ that is stored within the smart card 400 at enrollment to compute key values $y_t$ and $a_{r1}'$ according to equations of the form:

$$y_t = \text{PIN}' + a_t \cdot x \pmod{P}, \text{ and}$$

$$a_{r1}' = \text{PIN}' \cdot z_1 \pmod{P}.$$

If the entered PIN' value is not correct, then key value $a_{r1}'$ is incorrect and cause subsequent failure during verification at the host system 502. The smart card processor 404 computes a difference value comparing the key $a_{r1}'$ and random number $a_t$ according to the equation:

$$d = a_{r1}' - a_t,$$

and immediately erases the random number $a_t$. The smart card processor 404 encrypts key value $y_t$ under a transmission key KT. The transmission key KT is commonly used for encryption of transmitted data, in a particular example using 128-bit SSL (Secure Sockets Layer) National Security Agency (NSA) standard transmission protocols. The processor 404 sends the resulting cryptogram $E_{KT}[y_t]$, along with the difference value d, via the terminal 510 to the host system 502. A different random number $a_t$ is generated by the smart card 400 for every transaction and the random number $a_t$ is not communicated to the host 502. Accordingly, another entity, such as an adversary, does not have access to the random number $a_t$ or the key $a_{r1}'$, and therefore cannot compute the customer-entered PIN'.

The entered PIN' is verified at the host system 502, for example using a security module 512. In some embodiments, the security module 512 at the host 502 uses the difference value d and the cryptogram $E_{KT}[y_t]$ that are received from the smart card 400 in combination with the reference cryptogram $E_{KDB}[y_r]$ that is stored in the host database 514 to verify the entered PIN'. The security module 512 can perform a simple verification test by verifying equality of a relationship of the form:

$$d \cdot x = y_r - y_t \pmod{P},$$

if the relationship is correct, then PIN' is equal to PIN and the transaction can be authorized.

The illustrative ephemeral polynomial algorithm is unusual and very different from traditional PIN verification algorithms, and therefore has various distinguishing attributes and benefits. The ephemeral polynomial algorithm is mathematically simple and computationally fast.

The ephemeral polynomial algorithm does not use the Personal Identification Number (PIN) directly in the PIN verification process. In particular, the ephemeral polynomial algorithm promotes data security by enabling the PIN to never be transmitted to the host and never be re-constructed as part of the verification process. Information sent to the host is sufficient to verify the PIN but is insufficient for the host or any other entity, such as an adversary, to reconstruct the PIN.

In the example of a first-order polynomial, for each account x the ephemeral polynomial algorithm enables the host system to maintain only a single point $(x, y_r)$ on a curve represented by a reference polynomial. Because reconstruction of a reference first-order polynomial requires n+1=2 "points" or "shares", the single share is insufficient to reconstruct the polynomial and to thereby recover the secret PIN. Embodiments using higher order polynomials maintain additional information shares.

Other than normal cryptographic keys, the ephemeral polynomial algorithm enables no key sharing between the host system and the terminal or smart card.

The smart card creates an irreversible form of the entered PIN' that differs on every transaction. The irreversible form of the entered PIN' is always different from any reference information on the host. The ephemeral polynomial algorithm generates the irreversible form of the entered PIN' by creating a different random number and ephemeral polynomial on each transaction and then using only one point on the curve represented by the polynomial. In secure embodiments, coefficients of the polynomial are erased after use and are never sent to the host. Accordingly, after a point is computed on the polynomial, the point is destroyed and cannot be re-created.

The ephemeral polynomial algorithm enables a high security system even if the smart card and PIN information stored on the host is not encrypted, contrary to conventional perceptions of PIN verification. However, because integrity of data at the host is essential in most environments, a database key protecting host data is commonly implemented to insure data integrity and eliminate concerns about whether any cryptography keys are to be used at the host. Generally, the database key, although easily implemented in the ephemeral polynomial algorithm, need not be used to encrypt a Personal Identification Number (PIN) and is not an essential part of the verification algorithm.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although particular equations with specific variable are disclosed to describe various operations, the operations performed can be described otherwise, either mathematically or non-mathematically. The operations, if described mathematically, can be modeled using other equations and/or variables. Furthermore, the disclosed examples describe data security operations in a financial system context. In other embodiments, the disclosed techniques and systems can be applied in various other data security settings, including general application to passwords, biometric data, and other forms of identification.

What is claimed is:

1. A method for on-line Personal Identification Number (PIN) verification comprising:
    initializing a smart card with an entity-selected PIN hidden in a polynomial over a finite field, an initialization polynomial being a function of the PIN, an entity-identifier, and a random number;
    discarding the random number and the PIN after smart card initialization;
    generating an ephemeral transaction polynomial using the smart card at an entity-activated terminal with an entity-entered PIN' enabling recovery from a polynomial over a finite field, the ephemeral transaction polynomial being a function of the entity-entered PIN', the entity-identifier, and a second random number;
    sending a function of the ephemeral transaction polynomial and a difference between the second random number and a function of the PIN' and the secret function to a host; and
    discarding the second random number.

2. The method according to claim 1 further comprising:
    verifying that the PIN is equivalent to the PIN' based on a relationship among the entity-identifier and a function of the initialization polynomial received from the on-line authorization system and the difference and function of the verification polynomial.

3. The method according to claim 1 further comprising:
    encrypting the function of the initialization polynomial prior to sending to the on-line authorization system; and
    encrypting the function of the verification polynomial prior to sending to the host.

4. A method for on-line Personal Identification Number (PIN) verification comprising:
    initializing a smart card with an entity-selected PIN hidden in a polynomial over a finite field, an initialization polynomial being a function of the PIN, an entity-identifier, and a random number;
    discarding the random number and the PIN after smart card initialization; and
    hiding the entity-selected PIN in a polynomial over a finite field of the form:

$$y = a_0 + \sum_{i=1}^{n} a_i x^i (\bmod P),$$

where P is a large prime number.

5. A method for on-line Personal Identification Number (PIN) verification comprising:
    initializing a smart card with an entity-selected PIN hidden in a polynomial over a finite field, an initialization polynomial being a function of the PIN, an entity-identifier, and a random number;
    discarding the random number and the PIN after smart card initialization;
    receiving on the smart card a large prime integer P, an entity-identifier x, and the entity-selected PIN;
    generating on the smart card a random number $a_{ri}$ between a lower limit L and the large prime integer P;
    computing a polynomial:

$$y_r = PIN + \sum_{i=1}^{N} a_{ri} \cdot x^i (\bmod P);$$

encrypting value $y_r$ as encryption function $E_k[y_r]$;
    sending the encryption function $E_k[y_r]$ to the on-line authorization system;
    computing on the smart card at least one value:

$$z_i = PIN^{-1} \cdot a_{ri} (\bmod P);$$

retaining the at least one value $z_i$ on the smart card; and
    erasing the random number $a_r$ and the PIN from the smart card.

6. The method according to claim 5 further comprising:
    storing on the on-line authorization system the entity-identifier x and a reference cryptogram $E_{KBD}[y_r]$ where KBD is a database key.

7. The method according to claim 5 further comprising:
    receiving at the smart card the entity-entered PIN' via an entity-activated terminal;
    generating on the smart card a random number $a_t$ between a lower limit L and the large prime integer P;
    computing at the smart card a polynomial:

$$y_t = PIN' + \sum_{i=1}^{N} a_{ti} \cdot x^i (\bmod P);$$

a value:

$a_r' = PIN' \cdot z_r (\bmod P);$ and a difference $d = a_r' - a_t;$
    erasing the random number $a_t$ from the smart card;
    encrypting the value $y_t$ and the difference value d at the smart card as encryption function $E_{KC}[d, y_t]$ under a transmission key KC;
    sending the encryption function $E_{KC}[d, y_t]$ to the host.

8. The method according to claim 7 further comprising:
    receiving at the host the encryption function $E_{KC}[d, y_t]$; and
    verifying the PIN' is equal to the PIN on condition that:

$d \cdot x = y_r - y_t (\bmod P).$

9. The method according to claim 7 wherein:
    information sent from the smart card to the host is sufficient to verify the PIN although insufficient for reconstructing the PIN.

10. The method according to claim 7 wherein:
    for an individual account corresponding to the entity-identifier x, the host maintains a single point on a curve represented by a reference polynomial so that the information stored on the host is insufficient to reconstruct the polynomial and recover the PIN.

11. The method according to claim 7 wherein:
    the smart card creates an irreversible form of the entity-entered PIN' that probabilistically differs on every transaction and probabilistically differs from any reference information on the host.

12. The method according to claim 5 wherein:
    the Personal Identification Number (PIN) is selected from among members of a group consisting of identification numbers, passwords, biometric data, fingerprints, retinal scans, electrical body signals, and pictorial images.

13. A method for on-line Personal Identification Number (PIN) verification comprising:
    initializing a smart card with an entity-selected PIN hidden in a polynomial over a finite field, an initialization polynomial being a function of the PIN, an entity-identifier, and a random number; and
    discarding the random number and the PIN after smart card initialization, wherein
    the smart card creates a probabilistically different random and ephemeral polynomial on every transaction and operates on only one point from the polynomial with the polynomial coefficients erased after every usage and restricted from transmission to the host.

14. The method according to claim 13 wherein:
    the Personal Identification Number (PIN) is selected from among members of a group consisting of identification numbers, passwords, biometric data, fingerprints, retinal scans, electrical body signals, and pictorial images.

15. A data security apparatus comprising:
    a smart card capable of on-line Personal Identification Number (PIN) verification comprising:
        an interface capable of communicating with an on-line authorization system and/or a host;
        a processor coupled to the interface; and
        a memory coupled to the processor and having a computable readable program code embodied therein that executes enrollment and transaction operations for on-line PIN verification based on hiding an entity-selected PIN in an ephemeral polynomial over a finite field.

16. The apparatus according to claim 15 wherein the memory further comprises:
    a computable readable program code capable of causing the processor to hide the entity-selected PIN in a polynomial over a finite field of the form:

$$y = a_0 + \sum_{i=1}^{n} a_i x^i (\bmod P),$$

where P is a large prime number.

17. The apparatus according to claim 15 wherein:
    the smart card sends information to the host that is sufficient to verify the PIN although insufficient for reconstructing the PIN.

18. The apparatus according to claim 15 wherein the memory further comprises:
    a computable readable program code capable of causing the processor to receive a large prime integer P, an entity-identifier x, and the entity-selected PIN;
    a computable readable program code capable of causing the processor to generate on the smart card a random number $a_r$ between a lower limit L and the large prime integer P;
    a computable readable program code capable of causing the processor to compute a polynomial:

$$y_r = PIN + \sum_{i=1}^{N} a_{ri} \cdot x^i (\bmod P);$$

a computable readable program code capable of causing the processor to encrypt value $y_r$ as encryption function $E_k[y_r]$;
a computable readable program code capable of causing the processor to send the encryption function $E_k[y_r]$ to the on-line authorization system;
a computable readable program code capable of causing the processor to compute on the smart card at least one value:

$$z_i = PIN^{-1} \cdot a_{ri} (\bmod P);$$

a computable readable program code capable of causing the processor to retain the at least one value $z_i$ on the smart card; and
a computable readable program code capable of causing the processor to erase the random number $a_r$ and the PIN from the smart card.

19. The apparatus according to claim 15 wherein the memory further comprises:
    a computable readable program code capable of causing the processor to initialize a smart card with an entity-selected PIN hidden in a reference polynomial over a finite field, the reference polynomial being a function of the PIN, an entity-identifier, and a random number;
    a computable readable program code capable of causing the processor to send the entity-identifier and a function of the reference polynomial to an on-line authorization system for enrollment;
    a computable readable program code capable of causing the processor to retain a secret function of the random number and inverse of the PIN on the smart card; and
    a computable readable program code capable of causing the processor to discard the random number and the PIN.

20. The apparatus according to claim 19 wherein the memory further comprises:
    a computable readable program code capable of causing the processor to receive an entity-entered PIN' via an entity-activated terminal, enabling recovery from a polynomial over a finite field;
    a computable readable program code capable of causing the processor to compute an ephemeral transaction polynomial as a function of the entity-entered PIN', the entity-identifier, and a second random number;
    a computable readable program code capable of causing the processor to send to a host a function of the ephemeral transaction polynomial, the host being capable of verifying that PIN is equivalent to PIN' at the host based on a relationship among the entity-identifier, a function of the reference polynomial, and the function of the ephemeral transaction polynomial; and
    a computable readable program code capable of causing the processor to discard the second random number.

21. The apparatus according to claim 20 wherein:
    the smart card creates an irreversible form of the entered PIN' that probabilistically differs on every transaction and probabilistically differs from any reference information on the host.

22. The apparatus according to claim 20 wherein:
    the smart card creates a probabilistically different random and ephemeral polynomial on every transaction and operates on only one point from the polynomial with the polynomial coefficients erased after every usage and restricted from transmission to the host.

23. The apparatus according to claim 20 wherein the memory further comprises:
a computable readable program code capable of causing the processor to encrypt the function of the reference polynomial prior to sending to the on-line authorization system; and
a computable readable program code capable of causing the processor to encrypt the function of the ephemeral transaction polynomial prior to sending to the host.

24. The apparatus according to claim 20 wherein the memory further comprises:
a computable readable program code capable of causing the processor to receive the entity-entered PIN' via an entity-activated terminal;
a computable readable program code capable of causing the processor to generate on the smart card a random number $a_t$ between a lower limit L and the large prime integer P;
a computable readable program code capable of causing the processor to compute at the smart card a polynomial:

$$y_t = PIN' + \sum_{i=1}^{N} a_{ti} \cdot x^i (\bmod P);$$

a value:

$$a_r' = PIN' \cdot z_i (\bmod P); \text{ and}$$

a difference $d = a_r' - a_r$;
a computable readable program code capable of causing the processor to erase the random number $a_t$ from the smart card;
a computable readable program code capable of causing the processor to encrypt the value $y_t$ and the difference d as encryption function $E_{KC}[d, y_t]$ under a transmission key KC;
a computable readable program code capable of causing the processor to send the encryption function $E_{KC}[d, y_t]$ to the host.

25. A data security apparatus comprising:
an enrollment terminal for usage with an on-line host authorization system comprising:
a communication interface capable of communicating with a network, a user interface, and a smart card interface configured to accept a smart card that executes initialization and transaction operations for on-line Personal Identification Number (PIN) verification based on hiding an entity-selected PIN in an ephemeral transaction polynomial over a finite field;
a processor coupled to the communication interface; and
a memory coupled to the processor and having a computable readable program code embodied therein capable of causing the processor to supply to the smart card a modulus P, an entity-identifier x, and a reference Personal Identification Number (PIN) for smart card computation of a reference polynomial of the form:

$$y_r = PIN + \sum_{i=1}^{n} a_{ri} x^i (\bmod P),$$

and having a computable readable program code capable of causing the processor to transfer from the smart card to a host the entity-identifier x and a function of the reference polynomial $y_r$.

26. The apparatus according to claim 25 further comprising:
a computable readable program code capable of causing the processor to encrypt the reference polynomial to a reference cryptogram.

27. The apparatus according to claim 25 wherein:
the smart card sends and the on-line host authorization system stores information that is sufficient to verify the PIN although insufficient for reconstructing the PIN.

28. The apparatus according to claim 25 wherein:
the on-line host authorization system receives from the smart card an encrypted reference polynomial function.

29. A data security apparatus comprising:
a host system capable of on-line Personal Identification Number (PIN) verification comprising:
a communication interface capable of communicating with a terminal configured to accept a smart card that executes enrollment and transaction operations for on-line PIN verification based on hiding an entity-selected transaction PIN' in an ephemeral polynomial over a finite field;
a host database capable of storing enrollment information for a plurality of enrolled smart cards;
a processor coupled to the communication interface and the host database; and
a memory coupled to the processor and having a computable readable program code embodied therein capable of causing the processor to receive from a transacting smart card information relating to a point on a curve generated from a polynomial hiding an entered transaction PIN' and compare the smart card information to database information relating to a point on a curve generated from a reference polynomial hiding a reference PIN.

30. The apparatus according to claim 29 wherein the memory further comprises:
a computable readable program code capable of causing the processor to receive an ephemeral transaction polynomial function from the smart card, receive an entity-identifier and reference polynomial function from the host database, and perform a comparison operation verifying that the reference PIN is equivalent to the transaction PIN' at the host based on a relationship among the entity-identifier, a function of the reference polynomial, and the function of the ephemeral transaction polynomial.

31. The apparatus according to claim 29 wherein:
neither the host system nor the smart card have sufficient information to reconstruct the entity-selected PIN but do have sufficient information to verify that the correct PIN' is entered.

32. The apparatus according to claim 29 wherein:
the reference polynomial function and the ephemeral transaction polynomial function are polynomials of the form:

$$y = a_0 + \sum_{i=1}^{n} a_i x^i (\bmod P),$$

where P is a large prime number.

33. The apparatus according to claim 29 wherein:
information sent from the smart card to the host system is sufficient to verify the PIN although insufficient for reconstructing the PIN.

34. The apparatus according to claim 29 wherein:
for an individual account corresponding to the entity-identifier, the host system maintains a single point on a curve represented by a reference polynomial so that the information stored on the host system is insufficient to reconstruct the polynomial and recover the PIN.

35. The apparatus according to claim 29 wherein:
the smart card creates an irreversible form of an entered PIN that probabilistically differs on every transaction and probabilistically differs from any reference information on the host system.

36. The apparatus according to claim 29 wherein:
the smart card creates a probabilistically different random and ephemeral polynomial on every transaction and operates on only one point from the polynomial with the polynomial coefficients erased after every usage and restricted from transmission to the host system.

37. A transaction system comprising:
a network;
a plurality of servers and/or hosts coupled to the network;
a plurality of on-line terminals coupled to the servers via the network;
a plurality of smart cards enrolled in the transaction system and capable of insertion into the on-line terminals and performing transactions via the servers; and
a plurality of processors distributed among the smart cards, the servers, and/or the on-line terminals, at least one of the processors being capable of executing enrollment and transaction operations for on-line PIN verification based on hiding an entity-selected PIN in an ephemeral polynomial over a finite field.

38. The transaction system according to claim 37 wherein at least one of the processors can execute a method for on-line Personal Identification Number (PIN) verification comprising:
initializing a smart card with an entity-selected PIN hidden in a polynomial over a finite field, a reference polynomial being a function of the PIN, an entity-identifier, and a random number; and
discarding the random number and the PIN after smart card initialization.

39. The transaction system according to claim 38 wherein the method for on-line Personal Identification Number (PIN) verification further comprises:
generating an ephemeral transaction polynomial using the smart card at an entity-activated terminal with an entity-entered PIN' enabling recovery from a polynomial over a finite field, the ephemeral transaction polynomial being a function of the entity-entered PIN', the entity-identifier, and a second random number;
sending a function of the ephemeral transaction polynomial and the difference between the second random number and a function of the PIN' and the secret function to a host; and
discarding the second random number.

40. The transaction system according to claim 39 wherein the method for on-line Personal Identification Number (PIN) verification further comprises:
verifying that the reference PIN is equivalent to the transaction PIN' at the host based on a relationship among the entity-identifier, a function of the reference polynomial, and the function of the ephemeral transaction polynomial.

41. A transaction system comprising:
means for verifying a Personal Identification Number (PIN);
means for initializing a smart card with an entity-selected PIN hidden in a polynomial over a finite field, a reference polynomial being a function of the PIN, an entity-identifier, and a random number;
means for sending the entity-identifier and a function of the reference polynomial to an on-line authorization system for enrollment;
means for retaining a secret function of the random number and inverse of the PIN on the smart card; and
means for discarding the random number and the PIN.

* * * * *